US012726721B2

(12) United States Patent
Li

(10) Patent No.: US 12,726,721 B2
(45) Date of Patent: Sep. 1, 2026

(54) METHOD FOR CONTROLLING MULTIPLE CAMERA COMPONENTS, COMPUTER DEVICES AND STORAGE MEDIUMS

(71) Applicant: MediaTek Singapore Pte. Ltd., Singapore (SG)

(72) Inventor: Jinlong Li, Anhui (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 53 days.

(21) Appl. No.: 18/943,272

(22) Filed: Nov. 11, 2024

(65) Prior Publication Data

US 2025/0287112 A1 Sep. 11, 2025

(30) Foreign Application Priority Data

Mar. 7, 2024 (CN) ........................ 202410264021.8

(51) Int. Cl.
*H04N 23/80* (2023.01)
*H04N 23/60* (2023.01)
*H04N 23/617* (2023.01)

(52) U.S. Cl.
CPC .................................. *H04N 23/80* (2023.01)

(58) Field of Classification Search
CPC ....... H04N 23/80; H04N 23/617; H04N 23/60
See application file for complete search history.

(56) References Cited

U.S. PATENT DOCUMENTS 9,215,472 B2 * 12/2015 Orr ...................... H04N 19/513
10,154,188 B2 * 12/2018 Horigome ............ H04N 19/115
11,373,281 B1 * 6/2022 Ravirala ................ G06T 7/215

* cited by examiner

*Primary Examiner* — Ahmed A Berhan
(74) *Attorney, Agent, or Firm* — McClure, Qualey & Rodack, LLP

(57) ABSTRACT

The present application discloses a camera component, a computer device, and a storage medium. A method for controlling multiple camera components includes: receiving a first request instruction from a first application to call multiple camera components; and responding to the first request instruction, establishing and executing a first virtual pipeline. The first virtual pipeline includes a plurality of first virtual pipeline processing stages, and each of the first virtual pipeline processing stages respectively calls one of the camera components to execute the first request instruction. The control method for multiple camera components provided by this application enables multiple components of the same camera to be called (or invoked) by multiple applications, and when multiple applications call multiple camera components at the same time, there will be no picture interruption or obvious frame drop problems.

12 Claims, 7 Drawing Sheets

Receive a first request instruction from a first application calling the camera components
S1
Establish and execute a first virtual pipeline in response to the first request instruction, wherein the first virtual pipeline includes a plurality of first virtual pipeline processing stages, and each of the first virtual pipeline processing stages respectively calls one of the camera components to execute the first request instruction
S2

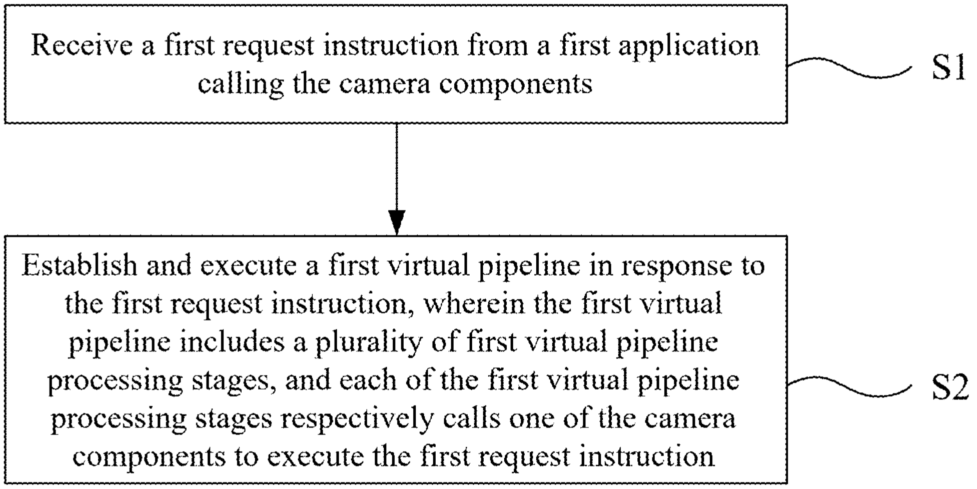

FIG. 1
Receive a first request instruction from a first application calling the camera components
S1
Establish and execute a first virtual pipeline in response to the first request instruction, wherein the first virtual pipeline includes a plurality of first virtual pipeline processing stages, and each of the first virtual pipeline processing stages respectively calls one of the camera components to execute the first request instruction
S2
Establish at least one first physical pipeline corresponding to the camera components
S3

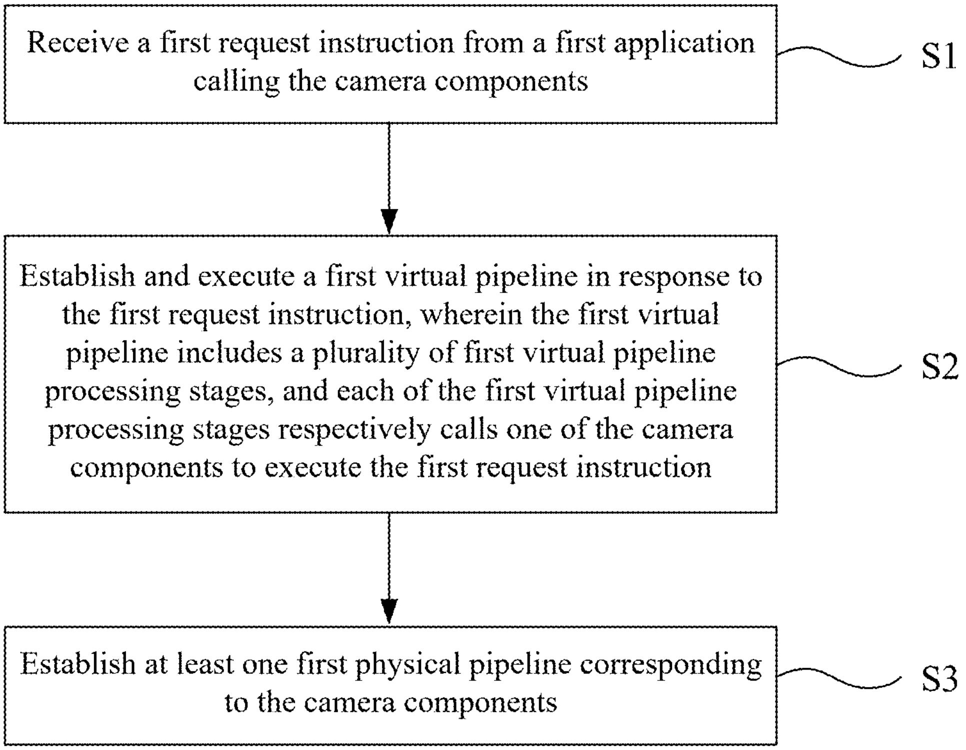

FIG. 2 first application processor second application

Send a first request instruction calling the camera components

Establish and execute a first virtual pipeline in response to the first request instruction Execute the instructions according to the first virtual pipeline processing stage Send a first request instruction calling the camera components Detect whether the camera components calling by the first virtual pipeline processing stage are in the idle state in response to the second request instruction Are the camera components in the idle state No Continue to execute the first request instruction Yes Establish and execute the second virtual pipeline Continue to execute the instructions according to the first virtual pipeline processing stage Execute the instructions according to the second virtual pipeline processing stage Is the second request instruction completely executed No Continue to execute the second request instruction Yes Finish the workflow Is the first request instruction completely executed No Continue to execute the first request instruction Yes Output the last frame image of the first virtual pipeline and the first frame image of the second virtual pipeline sequentially

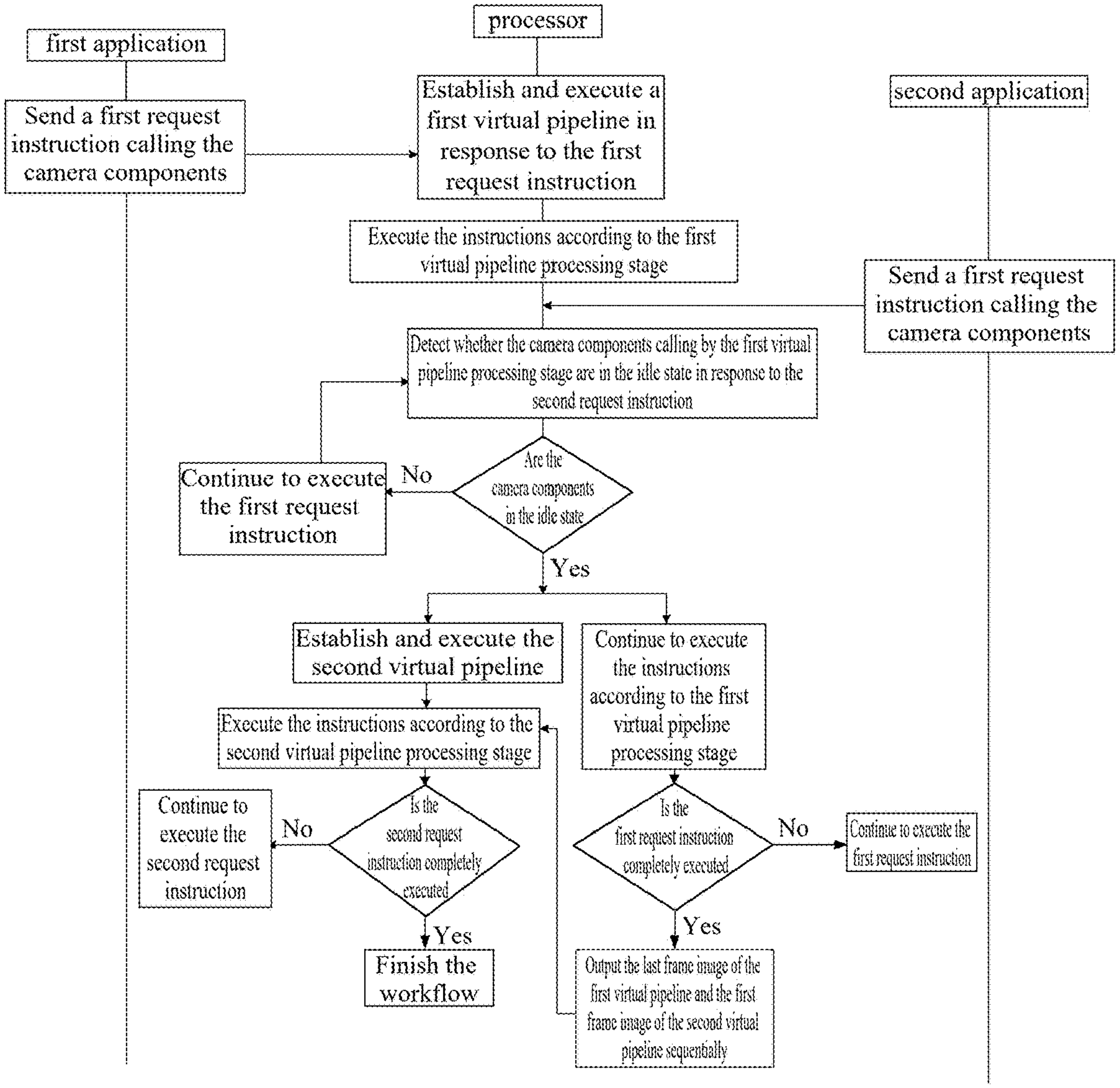

FIG. 4

Non-support for multi-channel

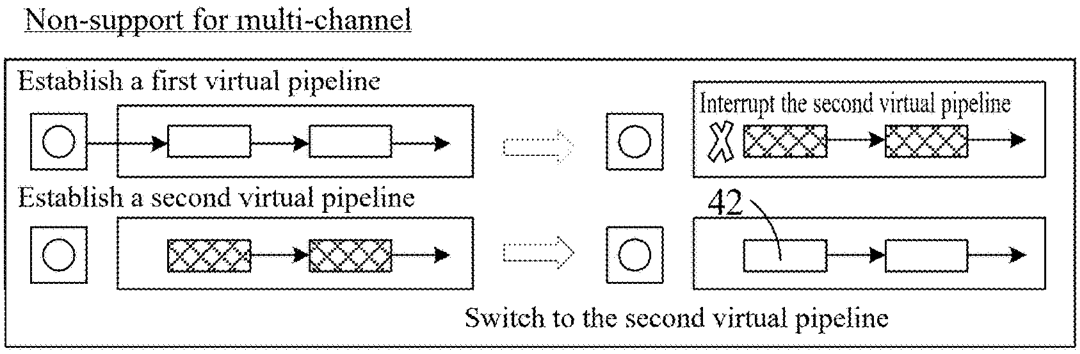

FIG. 5

METHOD FOR CONTROLLING MULTIPLE CAMERA COMPONENTS, COMPUTER DEVICES AND STORAGE MEDIUMS

CROSS REFERENCE TO RELATED APPLICATIONS

This Application claims priority of China Patent Application No. 202410264021.8, filed on Mar. 7, 2024, the entirety of which is incorporated by reference herein.

BACKGROUND OF THE INVENTION

Field of the Invention

The present invention relates to computer visual measurement technology, and, in particular, it relates to a method of controlling multiple camera components, computer devices, and storage mediums.

Description of the Related Art

Cameras are widely used not only in consumer electronics (such as cellphones and tablet computers), but also in security monitoring, video conferencing, and as vehicular onboard cameras, among a number of other product fields. In this category of products, cameras provide a core function. Based on the prior art, the level of complexity of camera utilization is increasing, meaning that the problems faced are becoming more and more difficult to solve. For example, it is hard for multiple applications to use the same camera at the same time. If another application calls a camera while the camera is in use, then the workflow of the present camera will experience picture interruption or obvious frame drop problems.

BRIEF SUMMARY OF THE INVENTION

In light of this, the present invention provides a method for controlling multiple camera components, computer devices, and storage mediums to address the difficulty in the prior art of the same camera being used simultaneously by multiple applications at the same time. If another application calls the camera while it is in use, the current camera workflow will be interrupted, or there will be noticeable frame dropping.

To resolve the technical problems described above, a first technical solution provided by the present invention is to provide a method for controlling multiple camera components comprising the step of receiving a first request instruction from a first application calling (invoking) the camera components, and establish and execute a first virtual pipeline in response to the first request instruction. The first virtual pipeline includes a plurality of first virtual pipeline processing stages, and each of the first virtual pipeline processing stages respectively calls (or invokes) one of the camera components to execute the first request instruction.

In some embodiments, the method for controlling multiple camera components further includes the following steps.

At least one second request instruction from a second application calling the camera components is received, and the second application is different from the first application.

In response to the second request instruction, a second virtual pipeline is established and executed. The second virtual pipeline includes a plurality of second virtual pipeline processing stages, and each of the second virtual pipeline processing stages respectively calls one of the camera components to execute the second request instruction. The camera components called by at least one of the second virtual pipeline processing stages are the same as the camera components called by at least one of the first virtual pipeline processing stages.

In some embodiments, the method for controlling multiple camera components further includes the following steps.

At least one second request instruction from the second application calling the camera components is received, and the second application is different from the first application.

In response to the second request instruction, the second virtual pipeline is established and executed. The second virtual pipeline includes a plurality of second virtual pipeline processing stages, and each of the second virtual pipeline processing stages respectively calls one of the camera components to execute the second request instruction. The second virtual pipeline processing stages are the same as the first virtual pipeline processing stages.

In some embodiments, the method for controlling multiple camera components further includes the following steps.

At least one first physical pipeline corresponding to the camera components is established. The first physical pipeline includes a plurality of first physical pipeline processing stages, the first virtual pipeline processing stages correspond to the first physical pipeline processing stages, and the first physical processing stages correspond to the camera components respectively.

At least one second physical pipeline corresponding to the camera components is established. The second physical pipeline includes a plurality of second physical pipeline processing stages, the second virtual pipeline processing stages correspond to the second physical pipeline processing stages, and the second physical processing stages correspond to the cameras components respectively.

In some embodiments, the unfinished operation of the first virtual pipeline is performed while the second virtual pipeline is executed.

In some embodiments, in response to the second request instruction, the second virtual pipeline is established and executed, and the method further comprises the following steps.

At least one of the camera components is switched to execute the second request instruction.

While the second virtual pipeline is being executed, the steps of executing the unfinished operation of the first virtual pipeline further comprises the following steps.

The other components of the camera components corresponding to the first virtual pipeline processing stages are continued to perform the unfinished operation of the first virtual pipeline.

In some embodiments, the first request instruction and the second request instruction are from different applications, and the first virtual pipeline and the second virtual pipeline of the applications are executed independently.

In some embodiments, before establishing the first virtual pipeline and the second virtual pipeline corresponding to multiple applications, the method further comprises the following steps.

It is determined whether the same camera components corresponding to the physical pipeline processing stages of the first physical pipeline and the second physical pipeline have support parameters corresponding to each of the applications.

In response to the camera components having support parameters corresponding to each of the applications, the support parameters of the camera components corresponding to the second virtual pipeline are the same as that corresponding to the first virtual pipeline.

In response to the camera components not having a support parameter corresponding to each of the applications, the support parameters of the camera components corresponding to the second virtual pipeline are different from that corresponding to the first virtual pipeline.

In some embodiments, the method for controlling multiple camera components further includes the following steps.

An image of a last frame of the first virtual pipeline and an image of a first frame of the second virtual pipeline are output sequentially.

In some embodiments, the camera components corresponding to the first physical pipeline processing stages and the second physical pipeline processing stages include one or more of the following: obtaining an image source, denoising the image, performing a screen capture, and then sensing and quantifying a distortion.

To resolve the technical problems described above, a second technical solution provided by the present invention is to provide a computer device comprising a processor, and a memory connected to the processor and configured to store a computer program executed on the processor. The processor executes the computer program to implement the method described above.

To resolve the technical problems described above, a third technical solution provided by the present invention is to provide a computer-readable storage medium. The computer-readable storage medium stores computer programs. The computer programs are executed by the processor to implement the method described above.

The beneficial effects of the present invention are: as distinguished from the prior arts, the method for controlling multiple camera components of the present invention includes: receiving a first request instruction from a first application calling multiple camera components; and establishing and executing a first virtual pipeline in response to the first request instruction. The first virtual pipeline includes a plurality of first virtual pipeline processing stages, and each of the first virtual pipeline processing stages respectively calls one of the camera components to execute the first request instruction. The method for controlling multiple camera components provided by this application enables multiple components of the same camera to be called by multiple applications, and multiple applications call multiple camera components at the same time without experiencing screen interruptions or noticeable frame drops.

BRIEF DESCRIPTION OF THE DRAWINGS

The present invention can be more fully understood by reading the subsequent detailed description and examples with references made to the accompanying drawings, wherein:

FIG. 1 shows an overall flowchart illustrating a method for controlling multiple camera components of the present invention;

FIG. 2 shows a flowchart illustrating a method for controlling multiple camera components according to the first embodiment of the present invention;

FIG. 4 shows an interaction flow schematic diagram illustrating a method for controlling multiple camera components of the present invention;

FIG. 5 shows a workflow diagram of comparison examples illustrating a plurality of virtual pipelines proceeded in parallel of the present invention;

DETAILED DESCRIPTION OF THE INVENTION

Figure 3:
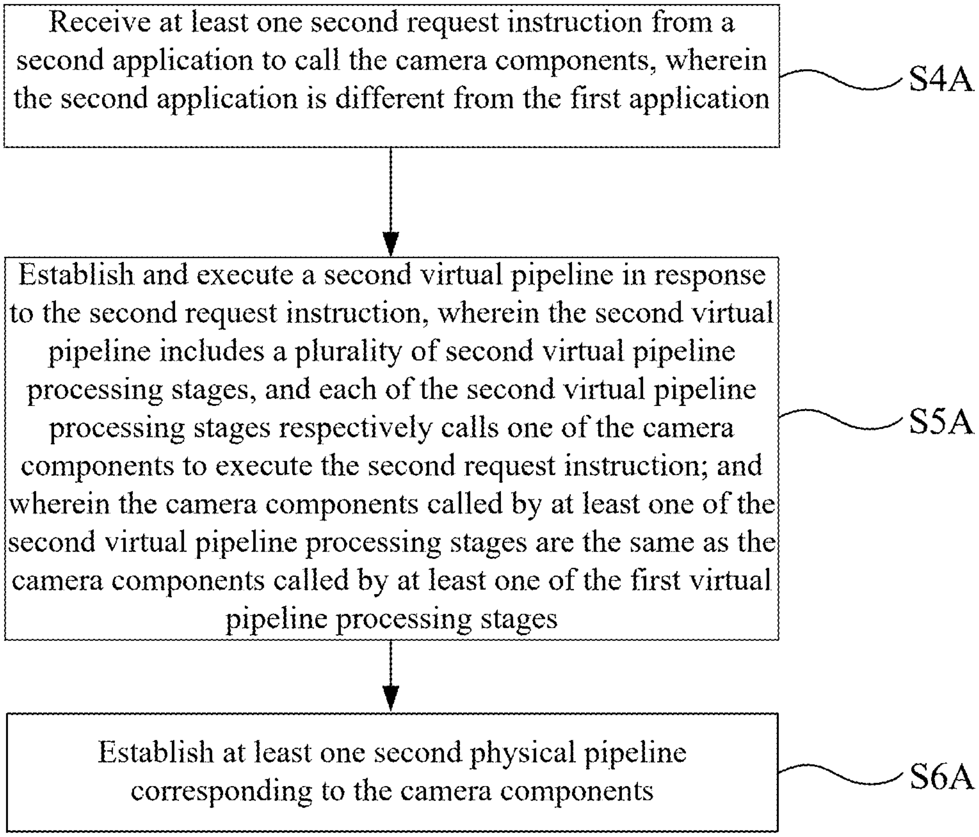
FIG. 3 shows a flowchart illustrating a method for controlling multiple camera components according to the second embodiment of the present invention.

The following description is combined with the drawings in the embodiments of the present application, to describe the technical solutions in the embodiments of the present application clearly and completely. Obviously, the described embodiments are merely part of the embodiments of the present application rather than all of embodiments. Based on the embodiments in the present application, all other embodiments obtained by the person skilled in the art without creative efforts are within the scope of protection of the present application.

The terms “first” and “second” in the present application are only used for descriptive purposes, and cannot be understood as indicating or implying the relative importance or implicitly indicating the number of indicated technical features. Thus, the features defined by “first” and “second” may explicitly or implicitly include at least one of these features. All directional indications (such as up, down, left, right, front, back . . . ) in the embodiments of this application are only used to explain the relative relationship of the position between the components in a specific posture (as shown in the drawings), sports conditions, etc. . . . If the specific posture changes, the directional indication will change accordingly. Furthermore, the terms “including” and “having” and any variations of these are intended to cover non-exclusive inclusion. For example, a process, method, system, product or device including a series of steps or units is not limited to the listed steps or units, but optionally includes steps or units that are not listed, or optionally includes other steps or units inherent to these processes, methods, products or devices.

The term "embodiment" herein means that a particular feature, structure, or characteristic described with reference to an embodiment, which may be included in at least one embodiment of the present application. The term in various locations in the specification does not necessarily refer to the same embodiment, nor is it an independent or alternative embodiment mutually exclusive with other embodiments. One skilled in the art should explicitly and implicitly understand that the embodiments described herein may be combined with other embodiments.

If the technical solution of the present application involves personal information, the products applying the technical solution of this application must clearly inform the personal information processing rules and obtain the separate consent from individuals before processing personal information. If the technical solution of the present application involves sensitive personal information, the product applying the technical solution of this application must obtain separate consent from individuals before processing sensitive personal information, and satisfy the requirement of "express consent" at the same time. For example, set clear and conspicuous signs on personal information collection devices such as cameras to inform that people have entered the personal information collection scope, and their personal information will be collected. If an individual voluntarily enters the collection scope, it is deemed to have agreed to the collection of his or her personal information. Or using obvious logos/information to inform personal information processing rules on the personal information processing devices, individual authorization can be obtained through pop-up information or by asking individuals to upload their personal information. Wherein, personal information processing rules may comprise information such as personal information processor, personal information processing purposes, processing methods, and types of personal information processing.

The inventor of the present application found that in the prior arts, it is difficult for the same camera to be used simultaneously by multiple applications at the same time. If another applications call (or invoke) the camera while it is using, the current camera workflow will be interrupted, or there will be noticeable frame dropping. After changing the camera pipeline at the same time, the workflow of the pipeline needs to be reconfigured, and the original camera pipeline in progress will be interrupted. After reopening the camera pipeline, there will find that the camera pipeline screen is disconnected for several frames. Especially, there may occur problems that the operating system does not support and it is difficult to virtualize the camera while the camera components used in vehicle-mounted virtualized camera operations.

To resolve problems described above, the present invention provides a method for controlling multiple camera components.

Figure 10:
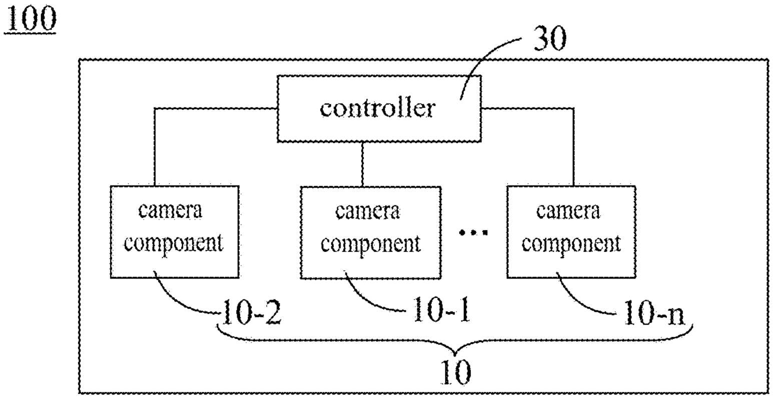
FIG. 10 shows a simplified structural diagram illustrating the hardware integrator having multiple camera components.

Refer to FIG. 1 and FIG. 10. FIG.1 is an overall flowchart illustrating a method for controlling multiple camera components of the present invention. FIG.10 is a simplified structural diagram illustrating the hardware integrator having multiple camera components.

The method for controlling the multiple camera components in this application includes the following steps.

S1: A first request instruction is received from a first application calling (or invoking) the multiple camera components.

Specifically, multiple camera components 10 connect to a controller 30 and receive calling instructions from application through the controller 30, and the camera components 10 respond through the controller 30 while the first application calls the camera components. The camera components 10 can be regarded as multiple components, which are used to photography and configured in hardware integrator. The camera components 10 can be called together or separately.

S2: A first virtual pipeline is established and executed, in response to the first request instruction. The first virtual pipeline includes a plurality of first virtual pipeline processing stages 41, and each of the first virtual pipeline processing stages 41 respectively calls one of the camera components 10 to execute the first request instruction.

Specifically, after responding to the first request instruction through the controller 30, the first instruction is processed through establishing the first virtual pipeline. The first virtual pipeline is divided into a plurality of processing stages in order to process different processing stages of the first virtual pipeline. For example, one or more the first camera components is called only through portions stages of the first virtual pipeline every time, rather than through all of the first virtual pipeline processing stage 41 to call the camera components 10, so that other unused first virtual pipeline processing stages 41 can execute the other camera components 10.

Refer to FIG. 2, FIG. 2 is a flowchart illustrating a method for controlling multiple camera components according to the first embodiment of the present invention.

In the first embodiment of the present invention, as described above can further include the following steps.

S3: At least one first physical pipeline corresponding to the camera components 10 is established.

Specifically, the first physical pipeline includes a plurality of first physical pipeline processing stages that correspond to the first virtual processing stages. One first virtual pipeline processing stage 41 corresponds to the first physical pipeline processing stages. The first physical processing stages that respectively correspond to the cameras components 10. For example, the cameras components 10 includes cameras 10-1, 10-2, 10-3 . . . 10-*n*. One camera component 10 can merely connect to one first physical pipeline processing stage every time.

Figure 6:
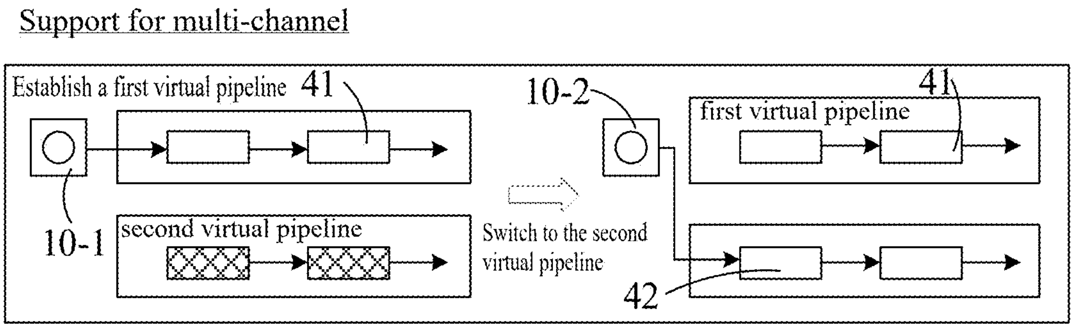
FIG. 6 shows a workflow diagram illustrating a plurality of virtual pipelines proceeded in parallel of the present invention.
Figure 11:
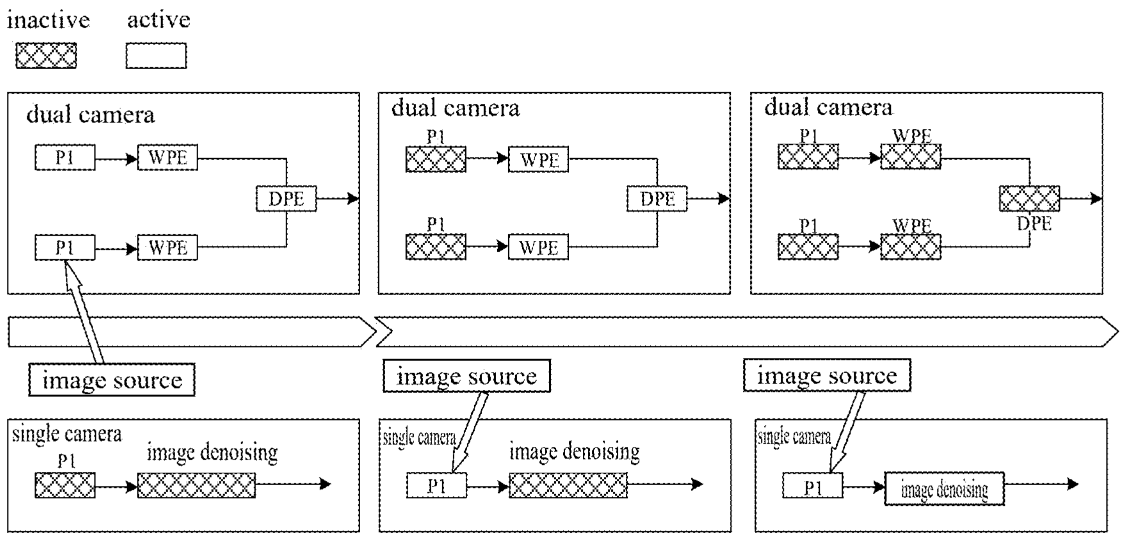
FIG. 11 shows a workflow schematic diagram illustrating two virtual pipelines proceeded in parallel and called multiple camera components according to one example of the present invention.
Figure 12:
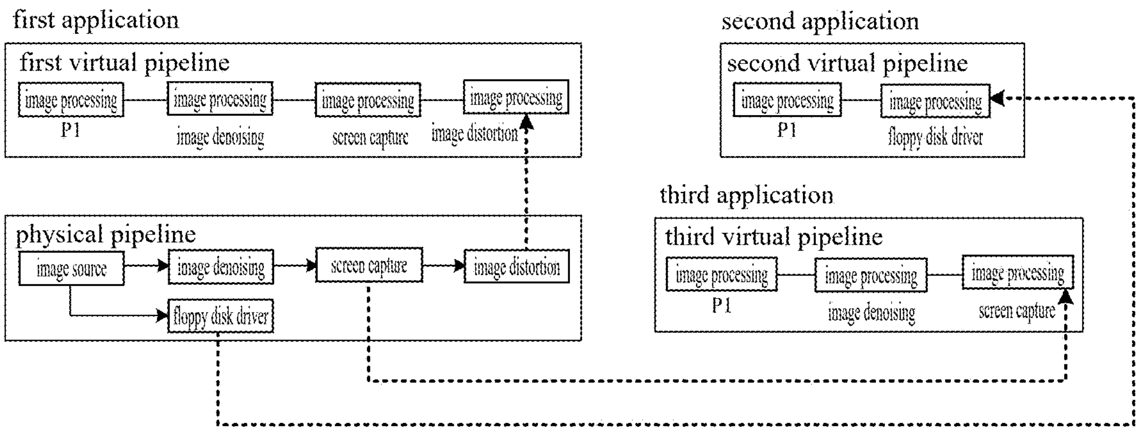
FIG. 12 shows a structure simplified diagram illustrating the supported parameters of multiple applications called the physical pipelines proceeded in parallel of the present invention.

Refer to FIG. 3 to FIG. 6 and FIG. 11 to FIG. 12, FIG. 3 is a flowchart illustrating a method for controlling multiple camera components according to the second embodiment of the present invention. FIG. 4 is an interaction flow schematic diagram illustrating a method for controlling multiple camera components of the present invention. FIG. 5 is a workflow diagram of comparison examples illustrating a plurality of virtual pipelines proceeded in parallel of the present invention. FIG. 6 is a workflow diagram illustrating a plurality of virtual pipelines proceeded in parallel of the present invention; wherein shade filled portions in FIG. 5 and FIG. 6 are inactive virtual pipeline processing stage. FIG. 11 is a workflow schematic diagram illustrating two virtual pipelines proceeded in parallel and called multiple camera components according to one example of the present invention. FIG. 12 is a structure simplified diagram illustrating the supported parameters of multiple applications called the physical pipelines proceeded in parallel of the present invention.

The second embodiment of the present invention provides a method of controlling the camera components 10, which includes the following steps.

S4A: At least one request instruction from the second application calling the camera components 10 is received. The second application is different from the first application.

Specifically, the second application is different from the first application, the camera components 10 are called through the second application, i.e., the cameras components 10 are called through applications other than the first application. At this time, the controller 30 needs to process the second request instruction from the second application while processing of the first application calling the camera components 10. It is to be understood that the second application is a collective term for other applications different from the first application, and the second application may be one or more than one.

S5A: A second virtual pipeline is established and executed, in response to the second request instruction, the second virtual pipeline comprises a plurality of second virtual pipeline processing stages 42. Each of the second virtual pipeline processing stages 42 respectively calls one of multiple camera components 10 to execute the second request instruction. The camera components 10 called by at least one of the second virtual pipeline processing stages are the same as the camera components 10 called by at least one of the first virtual pipeline processing stages.

Specifically, refer to FIG. 4, FIG. 6, FIG. 10 and FIG. 11, the process of establishing and executing of the second virtual pipeline is basically the same as the first virtual pipeline. The second virtual pipeline comprises the second virtual pipeline processing stages 42, and calls the camera components 10 through some or all of the virtual pipeline processing stages. The virtual pipeline processing stages can call one or more camera components 10 to execute the second request instruction from the second application. The camera components 10 called by the second virtual pipeline processing stages are partially overlapped with the camera components 10 are called by the first virtual pipeline processing stages, thereby runtime management is required for the camera components 10 that are called multiple times or repeatedly. The camera components 10 called by the second virtual pipeline processing stages 42 can be the same or different from the camera components 10 called by the first virtual pipeline processing stages 41. At least one camera component 10 called by the second virtual pipeline processing stages 42 is the same as the camera components 10 called by the first virtual pipeline processing stages 41, and the other camera components can be the same or different, the present application is not restricted for this.

For example, refer to FIG. 11, while the camera components 10 are operated in dual camera mode, the first virtual pipeline is at the operating state. At this time, the first virtual pipeline calls the camera components 10 to carry out the processing. After the camera components 10 called by the first stage (e.g., stage P1) of the first virtual pipeline are completed, the camera components 10 are inactive or in the idle state at this moment. So that the second virtual pipeline operated in single camera mode can call the camera components 10 of the first stage (e.g., stage P1) to operate. The second stage (e.g., WPE stage) of the first virtual pipeline keeps operating, and the second virtual pipeline follows the first virtual pipeline closely to operate. While calling the camera components 10 for the second stage (e.g., WPE stage) of the first virtual pipeline is completed, the second virtual pipeline can call the camera components 10 in the second stage. After all working stages of the first virtual pipeline are completed, the second virtual pipeline can also finish calling operating of the camera components 10 in the shortest time, thereby minimizing waiting and connection time between two virtual pipelines. Then the first application and the second application output the camera frames processed by the first virtual pipeline and the second virtual pipeline sequentially to implement maximum seamless connectivity.

In the embodiment of the present invention further provides the following steps.

S6A: At least one second physical pipeline corresponding to the camera components 10 is established.

Specifically, the second physical pipeline comprises a plurality of second physical pipeline processing stages, the second virtual pipeline processing stages 42 correspond to the second physical pipeline processing stages, and one physical pipeline processing stage can correspond to the virtual pipeline processing stages. The second physical pipeline processing stages correspond to the camera components 10, one camera component 10 can merely connect one second physical pipeline processing stage at a time.

The property of the second physical pipeline and the first physical pipeline can be the same, the second physical pipelines can broadly refer to physical pipelines other than the first physical pipeline. For example, while the second applications call the physical pipelines at the same time, since the first physical pipeline has been called and occupied by the first virtual pipeline processing stages 41 at this time, the calling instructions from the second application can be one-to-one response by the second physical pipelines. It is to be understood that the first physical pipeline and the second physical pipeline described here can respectively correspond to the same or different physical pipeline processing stages.

Refer to FIG. 5, the calling process of the camera components 10 of the prior art must complete processing the previous virtual pipeline or interrupted processing of the virtual pipeline before processing the next virtual pipeline. The physical pipeline and the virtual pipeline of the prior art are one-to-one corresponding relationship, each of the physical pipelines merely can call by one virtual pipeline. Therefore, the virtual pipelines of the prior art cannot proceed in parallel. If the present virtual pipeline did not executed completely, the next virtual pipeline cannot be establish. Thus, the problem of calling failure or the problem of interruption of the previous virtual pipeline will be caused. In response to the problems described above, refer to FIG. 6, the present application configures the virtual pipelines, and each of the virtual pipelines corresponds to one physical pipeline, so that the camera components 10 can respond to calling instructions from the applications. The virtual pipelines can proceed in parallel to execute the request instructions thereby saving time and improving work efficiency. For example, refer to FIG. 12 in accordance with an embodiment of the present invention, the physical pipeline comprises a plurality of physical pipeline stages, these physical pipeline stages respectively are receiving image from the image source, image denoising, screen capture, image distortion, floppy disk device processing. In the traditional technics, the physical pipeline merely can support the same virtual pipeline, e.g., the first virtual pipeline of the first application, the second virtual pipeline of the second application or the third virtual pipeline of the third application. In the embodiment of the present invention, the different physical pipeline stages of the same physical pipeline can be called by the virtual pipelines at the same time. For example, the screen capture stage is called by the third virtual pipeline from the third application, the image distortion stage is called by the first virtual pipeline from the first application, the floppy disk device processing stage is called by the second virtual pipeline from the second application.

Accordingly, the embodiments of the present invention resolve the technical problems described in the prior art that the physical components of the same camera cannot respond to multiple applications, and improve work efficiency of the camera system. The embodiments of the present invention also avoids the technical problem of latency and frame loss caused by the fact that a single physical pipeline can only support a single virtual pipeline, which results in the virtual pipeline needing to perform shutdowns, reconfigurations, and other processes when the applications call the camera component.

Figure 7:
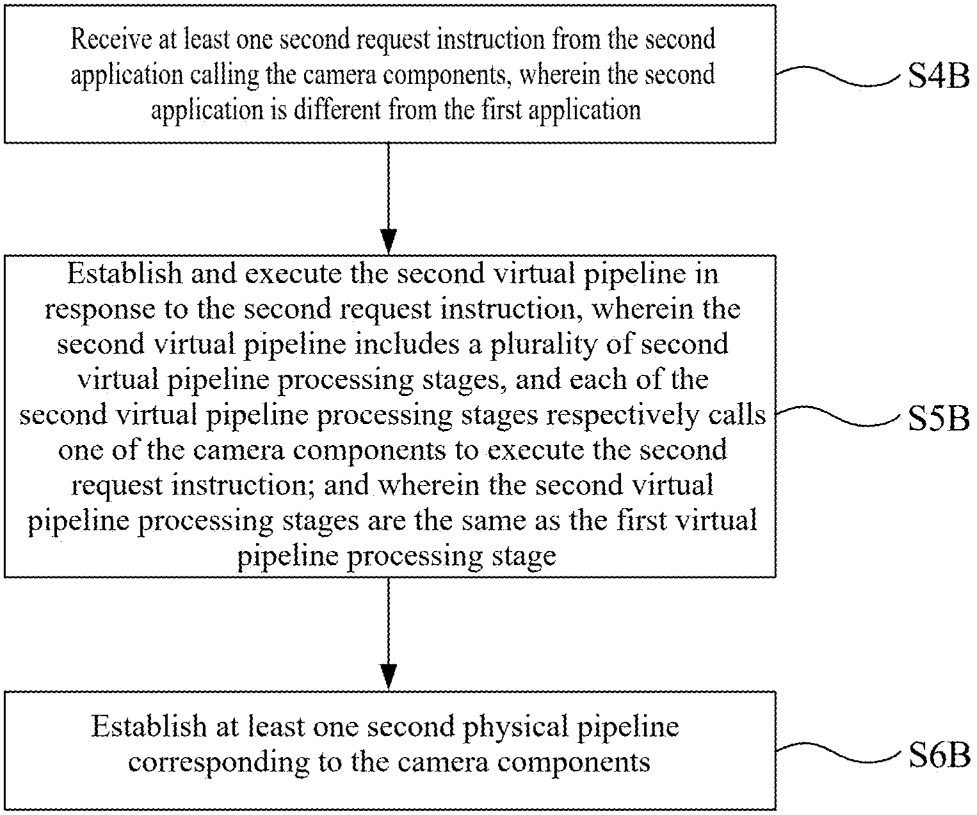
FIG. 7 shows a flowchart illustrating a method for controlling multiple camera components according to the third embodiment of the present invention.

Refer to FIG. 7, FIG. 7 is a flowchart illustrating a method for controlling multiple camera components according to the third embodiment of the present invention.

The third embodiment of the present invention provides a method for controlling the camera components further provides the following steps.

S4B: At least one second request instruction from the second application calling the camera components 10 is received. The second application is different from the first application.

S5B: A second virtual pipeline is established and executed, in response to the second request instruction, the second virtual pipeline comprises a plurality of second virtual pipeline processing stages 42. Each of the second virtual pipeline processing stages 42 respectively calls one of the camera components 10 to execute the second request instruction. The second virtual pipeline processing stages 42 is the same as the first virtual pipeline processing stages 41.

Specifically, the present embodiment is basically the same as the second embodiment, and the difference is that the second virtual pipeline processing stages 42 are the same as the first virtual pipeline processing stages 41. That is to say, the camera components 10 called by the second virtual pipeline processing stages 42 are completely the same camera components 10 called by the first virtual pipeline processing stages 41. For example, while there are ten camera components in total, the first to fifth camera components are called by the first virtual pipeline processing stages 41, the first camera components 10-1 to the fifth camera components 10-5 are also called by the second virtual pipeline processing stages 42. At the moment, the order of using the first camera components 10-1 to the fifth camera components 10-5 need to be managed. For example, after the first camera components 10-1 is called by the first virtual pipeline processing stages 41, the first camera components 10-1 can called by the second virtual pipeline processing stages 42, and so on, the other camera components 10 can be called by the same order.

S6B: At least one second physical pipeline corresponding to the camera components 10 is established.

Specifically, the second physical pipeline comprises a plurality of the second physical pipeline processing stages, the second virtual pipeline processing stages 42 correspond to the second physical pipeline processing stages, one physical pipeline processing stage can correspond to the virtual pipeline processing stages. The second physical pipeline processing stages respectively correspond to the camera components 10, one camera component 10 merely can connect one second physical pipeline processing stage every time.

The camera components 10 corresponding to the first physical pipeline processing stages and the second physical pipeline processing stages can comprise one or more of the image source (obtaining an image source), MSNR (maximum-signal-noise ratio), Dptz Capture (performing a screen capture) and Warp PQ (sensing and quantifying a distortion).

Refer to FIG. 4, the first request instruction and the second request instruction are from different applications.

That is to say, the camera components 10 are called by different applications, and the controller 30 responds request instructions from different applications to establish and execute the virtual pipelines that comprise the first virtual pipeline and the second virtual pipeline. The first virtual pipeline and the second virtual pipeline of the applications are mutually independent execution and not intermeddled each other. It is to be understood that the execution process of the second request instruction is not affected the execution process of the first request instruction, both of them can proceed in parallel.

It can be seen from the above embodiment that in any embodiment described above of the present application, the first virtual pipeline comprises a plurality of the first virtual pipeline processing stages 41, as shown in FIG. 6. Further, the first physical pipeline comprises the first physical pipeline processing stages, the first virtual pipeline processing stages 41 correspond to the first physical pipeline processing stages, the first physical pipeline processing stages respectively correspond to the camera components 10.

The second virtual pipeline comprises a plurality of the second virtual pipeline processing stages 42, the second physical pipeline comprises the second physical pipeline processing stages, the second virtual pipeline processing stages 42 correspond to the second physical pipeline processing stages, the second physical pipeline processing stages respectively correspond to the camera components 10.

Figure 8:
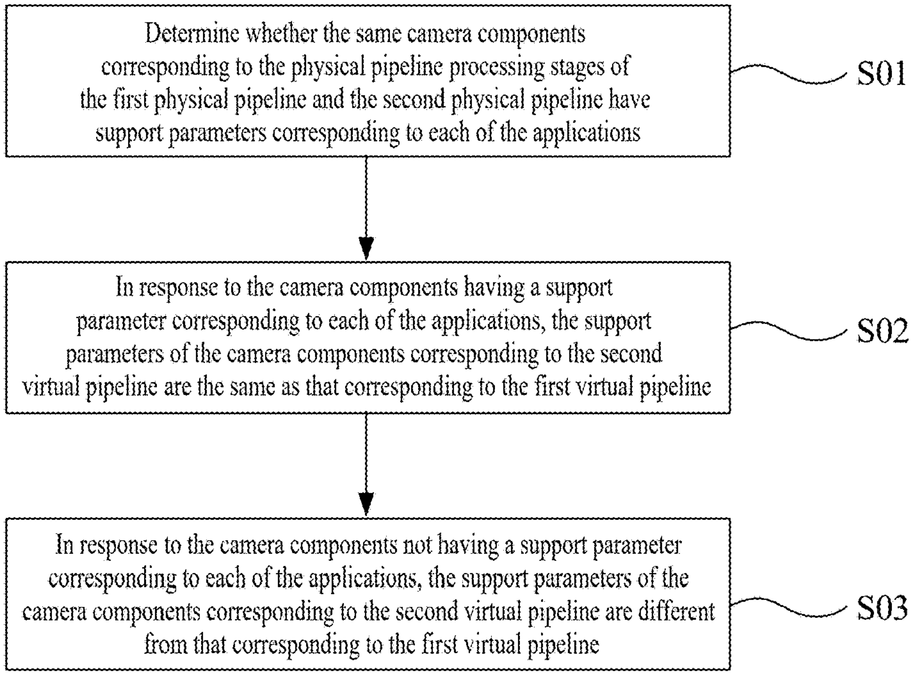
FIG. 8 shows a flowchart illustrating steps before establishing the first virtual pipeline and the second virtual pipeline corresponding to multiple applications of the present invention.

Refer to FIG. 8, FIG. 8 is a flowchart illustrating the steps before establishing the first virtual pipeline and the second virtual pipeline that correspond to multiple applications of the present invention.

Any embodiment may further comprise the steps below before the first virtual pipeline and the second virtual pipeline corresponding to the applications are established.

S01: It is determined whether the same camera components 10 corresponding to the physical pipeline processing stages of the first physical pipeline and the second physical pipeline have support parameters corresponding to every application.

Specifically, it is to be understood that the camera components 10 corresponding to the physical pipeline processing stages and the corresponding applications have the corresponding support parameters, so that the applications can call the camera components 10, otherwise there may have problems of calling failure. In short, the physical pipeline is a physical hardware product, the physical pipeline processing stages have multiple support parameters, one physical pipeline can support the virtual pipelines proceed in parallel. Every time, the execution of virtual pipeline processing stage calling the camera components 10 needs to relay on underlying support of the physical pipeline to implement. The camera components 10 need to have the support parameters corresponding to each application calling it, so that the applications call the camera components 10 successfully. At the same time, the applications also need to have the support parameters corresponding to the physical pipeline, so that the physical pipeline can support the executed instructions of corresponding applications. For example, the support parameters of the physical pipeline comprise image process (image processing), MSNR (maximum-signal-noise ratio), Dptz Capture (screen capture) and Warp PQ (distortion sense and quantify), etc. The application calling the camera components 10 should also have at least one support parameter described above. It is to be understood that the controller 30 can detect the compatibility of the application to determine whether the application and the camera component 10 it has called have support parameters that correspond with the physical pipeline. For example, the first application, the second application and the third application need to have support parameters that are the same as the physical pipeline to call the camera components 10 corresponding to the physical pipeline, as shown in FIG. 12. Meanwhile, in FIG. 12, the first application, the second application and the third application can call the different parameters of the physical pipeline at the same time. It is unnecessary to wait for the other applications to complete execution before calling, thereby improving the work efficiency of using the camera components 10 and reducing the wait time. While the applications need to call the camera component with the same parameters, they need to wait for the previous application to finish calling it.

S02: In response to the camera components 10 having a support parameter corresponding to each application, the support parameters of the camera components 10 corresponding to the second virtual pipeline are the same as the first virtual pipeline.

Specifically, while the controller 30 detects the camera components 10 having a support parameter corresponding to each application, the controller 30 will pass the first virtual pipeline that is formed in response to the first request instruction, and pass the second virtual pipeline that is formed in response to the second request instruction, the corresponding camera components 10 have the same support parameters.

S03: In response to the camera components 10 not having the support parameter corresponding to each application, the support parameters of the camera components 10 corresponding to the first virtual pipeline are different from the support parameters of the camera components 10 corresponding to the second virtual pipeline.

Specifically, if the support parameters of the camera components 10 are different from the support parameters corresponding to each virtual pipeline, the support parameters of the camera components 10 forming the first virtual pipeline are also different from the support parameters of the camera components 10 forming the second virtual pipeline.

In the second embodiment and the third embodiment of the present application described above, in response to the second request instruction, step S5A or step S5B of the second virtual pipeline is established and executed, there can further provides the following steps.

At least one of the camera components is switched to execute the second request instruction.

Specifically, as described above, the first virtual pipeline can comprise a plurality the first virtual pipeline processing stages 41. In the process of the first virtual pipeline processing stages 41, the first request instruction is executed sequentially, while the camera components 10 called by the first virtual pipeline processing stages 41 that has completed the first instruction will then be in an idle state. At the moment, the second pipeline processing stages 42 of the second pipeline can call the camera components 10 in the idle state sequentially to perform operations of corresponding processing stages, thereby completing the second request instructions.

Figure 9:
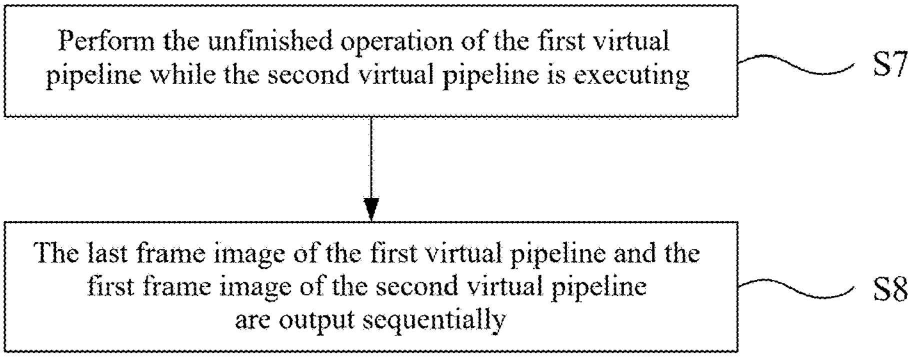
FIG. 9 shows a flowchart illustrating steps of establishing multiple camera components corresponding to at least one second physical pipeline according to an embodiment of the present invention.

Refer to FIG. 9, which is a flowchart showing the steps of establishing multiple camera components corresponding to at least one second physical pipeline according to an embodiment of the present invention.

Any of the first embodiment to the third embodiment of the present application provided above may further comprise the following steps.

S7: The unfinished operation of the first virtual pipeline is performed while second virtual pipeline is executed.

That is to say, while the second virtual pipeline is executed, the operation of the first virtual pipeline will be not interrupted.

In the further embodiment, while the second virtual pipeline is executed, step S7 of performing the unfinished operation of the first virtual pipeline may further comprise the following steps.

S71: The other components of the camera components 10 corresponding to the first virtual pipeline processing stages are continued to execute the unfinished operation of the first virtual pipeline.

Specifically, as described above, the second virtual pipeline processing stages 42 of the second virtual pipeline can call the camera components 10 in the idle state sequentially to execute the second request instruction. For example, the first virtual pipeline comprises 1-10 processing stages. While the processing of the camera components 10 called by each first virtual pipeline processing stage 41 is proceed to the second camera component or the third camera component, the first camera component 10 to the second camera component 10 are in the idle state. The second pipeline processing stages 42 can call starting from the first idle camera component to execute the second request instruction. It is to be understood that the second virtual pipeline processing stages 42 can call the idle camera component 10, once each of the camera components 10 called by the first virtual pipeline processing stage 41 is idle.

In the prior art, after all processing stages of each virtual pipeline are completed, the next virtual pipeline will be able to perform the corresponding operation. (e.g., after 10 processing stages of the first virtual pipeline calling the camera components 10 are all completed, the second virtual pipeline processing stages will be processed from the first processing stage). Unlike the prior art, the virtual components provided in this application can call the camera components 10 in parallel. For example, once one of the camera components 10 called by the first virtual pipeline processing stages is in the idle state, the second virtual pipeline processing stages can start perform operations to call the corresponding idle camera component 10, thereby greatly improving work efficiency of the camera components 10 and saving time.

Refer to FIG. 9, in which any of the first embodiment to the third embodiment of the present application provided above may further comprise the following steps.

S8: The last frame image of the first virtual pipeline and the first frame image of the second virtual pipeline are output sequentially.

Specifically, the first virtual pipeline has a plurality of processing stages. Each of the first virtual pipeline processing stages outputs a relative image, as shown in FIG. 4, and the second virtual pipeline has a plurality of processing stages. Each of the second virtual pipeline processing stages outputs corresponding images. The last frame image of the first virtual pipeline and the first frame image of the second virtual pipeline are output sequentially for seamless connection, so as to avoid picture interruption or frame dropping of the image. For example, the first virtual pipeline has three processing stages. After the first processing stage of the first virtual pipeline is completed, the second virtual pipeline can start working to call the first camera component that was not called by the first virtual pipeline, while the second and third processing stages of the first virtual pipeline continue to be executed. The processing stages of the second virtual pipeline work sequentially. After all three processing stages of the first virtual pipeline have been executed, the first virtual pipeline is seamlessly connected to the first stage of the second virtual pipeline, thus solving the problem of picture interruption or dropped frames of the image. Until the processing stages of the second virtual pipeline are all executed, and the first virtual pipeline is in the idle state, they can continue to respond to new request instructions from the applications.

The present application provides a method for controlling multiple camera components including the steps below. A first request instruction from a first application calling multiple camera components is received, and a first virtual pipeline is established and executed in response to the first request instruction. The first virtual pipeline includes a plurality of first virtual pipeline processing stages, and each of the first virtual pipeline processing stages respectively calls one of the camera components to execute the first request instruction. The control method for multiple camera components provided by this application enables multiple components of the same camera to be called by multiple applications, and there will be no picture interruption or obvious frame drop problems while multiple applications call multiple camera components at the same time.

Figure 13:
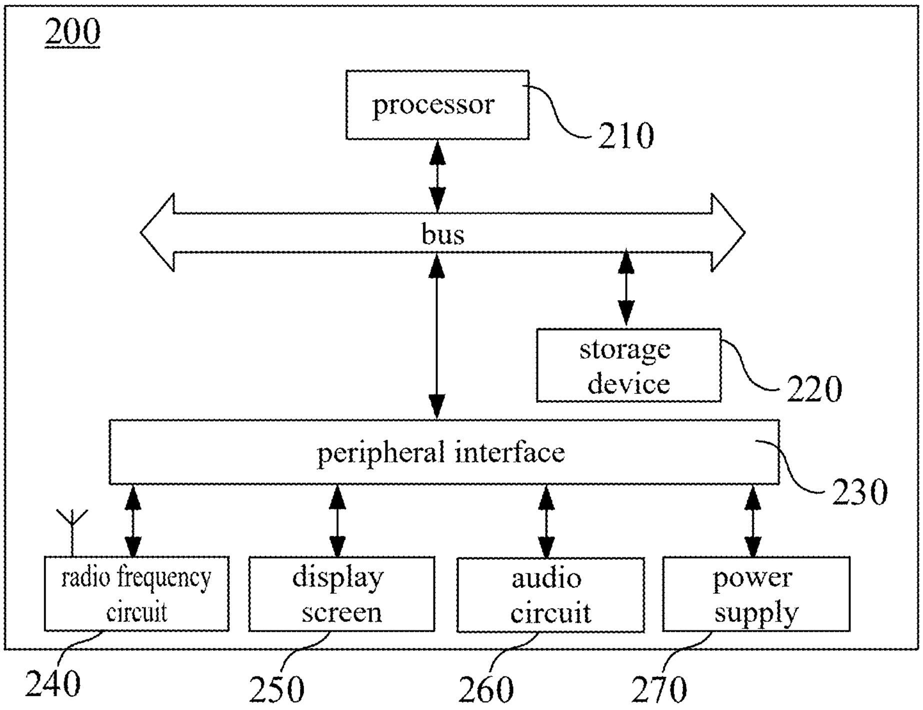
FIG. 13 shows a structure schematic diagram illustrating the computer device of the present invention.

Refer to FIG. 13, which is a structure schematic diagram of the computer device provided by the present invention.

Specifically, a computer device 200 may comprise a processor 210 and a memory 220. The memory 220 is coupled to the processor 210.

The processor 210 is configured to control the operation of the computer device 200, and the processor may be referred to as a CPU (Central Processing Unit). The processor 210 may be an integrated circuit chip with signal processing capabilities. The processor 210 may further be a general-purpose processor, a digital signal processor (DSP), an application-specific integrated circuit (ASIC), a field-programmable gate array (FPGA) or another programmable logic device, discrete gate or transistor logic device, or discrete hardware component. The general-purpose processor may be a microprocessor, or the processor 210 may be any conventional processor.

The memory 220 is configured to store computer programs, which may be RAM, ROM, or other types of storage devices. Specifically, the memory may comprise one or more computer-readable storage medium, and the computer-readable storage medium may be non-transitory. The memory may comprise high-speed random-access memory, and non-volatile memory, such as one or more magnetic disk storage devices and flash memory storage devices. In some embodiments, the non-transitory computer-readable storage medium in the memory are configured to store at least one piece of program code.

The processor 210 is configured to execute the computer programs stored in the memory 220 to implement the camera components described in the embodiment of the present application.

In some implementations, the computer device 200 may further comprise peripheral device interface 230 and at least one peripheral device. The processor 210, the memory 220 and the peripheral device interface 230 may be connected through busses or signal lines. Each of the peripheral devices may be connected to the peripheral device interface 230 through a bus, a signal line or a circuit board. Specifically, the peripheral devices comprise at least one of a radio frequency circuit 240, a display screen 250, an audio circuit 260, and a power supply 270.

The peripheral device interface 230 may be configured to connect at least one peripheral device related to I/O (Input/output) to the processor 210 and the memory 220. In some embodiments, the processor 210, the memory 220, and the peripheral interface 230 are integrated on the same chip or circuit board. In some other embodiments, any or two of the processor 210, the memory 220, and the peripheral interface 230 can be implemented on an individual chip or circuit board, which is not limited to the present embodiment.

The radio frequency circuit 240 is configured to receive and transmit RF (Radio Frequency) signals, which also referred to as electromagnetic signals. The radio frequency circuit 240 communicates with the communication network and other communication devices through the electromagnetic signals, and the radio frequency circuit 240 is the communication circuit of the computer device 200. The radio frequency circuit 240 converts the electrical signals into the electromagnetic signals for transmission, or converts received electromagnetic signals into the electrical signals. Optionally, the radio frequency circuit 240 comprises an antenna system, an RF transceiver, one or more amplifiers, a tuner, an oscillator, a digital signal processor, a codec chipset, a user identity module card, etc. The radio frequency circuit 240 may communicate with other terminals through at least one wireless communication protocol. The wireless communication protocols comprise but are not limited to World Wide Web, metropolitan area network, intranet, various generations of the mobile communication networks (2G, 3G, 4G and 5G), wireless LAN and/or Wi-Fi (Wireless Fidelity) network. In some embodiments, the radio frequency circuit 240 may further comprise NFC (Near Field Communication) related circuits, which are not limited in the present application.

A display screen 250 is configured to display UI (User Interface). The UI can comprise graphics, text, illustrations, videos, and any combination of these. While the display screen 250 is a touch display screen, the display screen 250 also has the ability to collect touch signals on or above the surface of the display screen 250. The touch signal may be input to the processor 210 as a control signal for processing. At a time, the display screen 250 can be used to provide virtual buttons and/or virtual keyboards, which also called soft buttons and/or soft keyboards. In some embodiments, there may be one display screen 250 that is set on the front panel of the computer device 200. In other embodiments, there may be at least two display screens 250 that are set on different surfaces of the computer device 200 or folding design. In other embodiments, the display screen 250 may be a flexible display screen, set on a curved surface or a folding surface of the computer device 200. Even, the display screen 250 may be set in a non-rectangular irregular shape, which also means a special-shaped screen. The display screen 250 can be made of LCD (Liquid Crystal Display), OLED (Organic Light-Emitting Diode) and other materials.

The audio circuitry 260 may comprise a microphone and a speaker. The microphone is configured to collect sound waves from the user and the environment, and convert the sound waves into electrical signals that are input to the processor 210 for processing, or input to the radio frequency circuit 240 to implement voice communication. For the purpose of personal sound collection or noise reduction, there can be multiple microphones, which are respectively configured at different parts of the computer device 200. The microphones can further be array microphones or omnidirectional collection type microphones. The speaker is configured to convert electrical signals from the processor 210 or the radio frequency circuit 240 into sound waves. The speaker may be a traditional membrane speaker or a piezoelectric ceramic speaker. While the speaker is a piezoelectric ceramic speaker, it can not only convert electrical signals into sound waves that are audible to humans, but also convert electrical signals into sound waves that are inaudible to humans for purposes such as measuring distance. In some embodiments, the audio circuitry 260 may further comprise a headphone jack.

The power supply 270 is configured to power each component in the computer device 200. The power supply 270 may be AC, DC, disposable batteries, or rechargeable batteries. While the power supply 270 includes rechargeable batteries, the rechargeable batteries may be wired rechargeable batteries or wireless rechargeable batteries. The wired rechargeable batteries are batteries charged through wired lines, and the wireless rechargeable batteries are batteries charged through wireless coils. The rechargeable batteries may further be configured to support fast charging technology.

The detailed description of the function and execution process of each functional module or component in the embodiment of the computer device 200 of the present application may be referred to the embodiments of the camera element of the present application described above, and will not be described here again.

In the several embodiments provided in this application, it should be understood that the computer device 200 and camera components as disclosed can be implemented in other ways. For example, each embodiment of the computer device 200 disclosed above is merely schematic in nature. For example, the division of modules or units is only a logical function division. There may be other division methods in actual implementation, such as multiple units or components may be combined or integrated into another system, or some features may be omitted, or not executed. On the other point, the coupling, direct coupling or communication connection shown or discussed may be through some interfaces, the indirect coupling or communication connection of the devices or units, which may be in electrical, mechanical or other forms.

The unit described as a separate component may or may not be physically separated. The component shown as a unit may or may not be a physical unit, and may be located in one place, or may be distributed to multiple network units. Some or all of the units can be selected according to actual needs to implement the purpose of this embodiment.

In addition, each functional unit in the embodiments of the present application may be integrated into one processing unit, or each unit may exist physically and separately, or two or more units may be integrated into one unit. The integrated units described above may be implemented in the form of hardware or software functional units.

Figure 14:
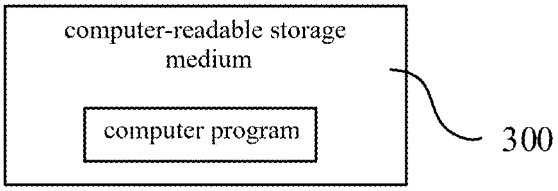
FIG. 14 shows a structure schematic chart illustrating the computer readable medium of the present invention.

Refer to FIG. 14, which is a structure schematic chart providing the computer readable medium according to an embodiment of the present invention.

Refer to FIG. 14. If the integrated unit described above is implemented in the form of a software functional unit and sold or used as an independent product, it can be stored in the computer-readable storage medium 300. Based on such an understanding, the essence of the technical solution of the present application, or contributive part for the prior arts, or all or part of the technical solution can be embodied in the form of a software product. The computer software product is stored in a storage medium, including some instructions/computer programs configured to cause a computer device (which can be a personal computer, a server, or a network device, etc.) or a processor to execute all or part of the steps of each implementation method of the present invention. The storage medium described above comprise: USB flash drive, portable storage device, ROM (Read-Only Memory), RAM (Random Access Memory), magnetic disk or various medium such as an optical disk, and the computers, mobile phones, laptops, tablets, or computer devices such as cameras having the medium described above.

The description of the execution process of the program data in the computer-readable storage medium 300 may be referred to the embodiments of the camera element of the present application described above, and will not be described here again.

The description above is only an implementation of the present application, the patent claim of the present application is not restricted for this. Any equivalent structure or process transformation utilized the contents of the description and drawings of this application, or directly or indirectly used in other related technical fields are also included in the claim of patent protection of the present application.

What is claimed is:

1. A method for controlling multiple camera components, comprising:

receiving a first request instruction from a first application calling the multiple camera components; and establishing and executing a first virtual pipeline in response to the first request instruction, wherein the first virtual pipeline includes a plurality of first virtual pipeline processing stages, and each of the first virtual pipeline processing stages respectively calls one of the multiple camera components to execute the first request instruction.

2. The method for controlling multiple camera components, as claimed in claim 1, further comprising:

receiving at least one second request instruction from a second application calling call the multiple camera components, wherein the second application is different from the first application; and establishing and executing a second virtual pipeline in response to the second request instruction, wherein the second virtual pipeline includes a plurality of second virtual pipeline processing stages, and each of the second virtual pipeline processing stages respectively calls one of the multiple camera components to execute the second request instruction; and wherein the camera components called by at least one of the second virtual pipeline processing stages are the same as the camera components called by at least one of the first virtual pipeline processing stages.

3. The method for controlling multiple camera components, as claimed in claim 2 further comprising:

establishing at least one first physical pipeline corresponding to the multiple camera components;

wherein the first physical pipeline includes a plurality of first physical pipeline processing stages, the first virtual pipeline processing stages correspond to the first physical pipeline processing stages, and the first physical processing stages correspond to the multiple camera components respectively; and establishing at least one second physical pipeline corresponding to the multiple camera components;

wherein the second physical pipeline includes a plurality of second physical pipeline processing stages, the second virtual pipeline processing stages correspond to the second physical pipeline processing stages, and the second physical processing stages correspond to the multiple cameras components respectively.

4. The method for controlling multiple camera components, as claimed in claim 3, wherein unfinished operation of the first virtual pipeline is performed while the second virtual pipeline is executed.

5. The method for controlling multiple camera components, as claimed in claim 4, wherein a step of establishing and executing the second virtual pipeline in response to the second request instruction further comprises:

switching at least one of the multiple camera components to execute the second request instruction;

wherein a step of executing the unfinished operation of the first virtual pipeline while the second virtual pipeline is being executed, comprises:

continuing to execute the unfinished operation of the first virtual pipeline through the other components of the camera components corresponding to the first virtual pipeline processing stages.

6. The method for controlling multiple camera components, as claimed in claim 2, wherein the first request instruction and the second request instruction are from different applications, and the first virtual pipeline and the second virtual pipeline of the applications are executed independently.

7. The method for controlling multiple camera components, as claimed in claim 6, wherein, before establishing the first virtual pipeline and the second virtual pipeline corresponding to multiple applications, the method further comprises:

determining whether the same camera components corresponding to the physical pipeline processing stages of the first physical pipeline and the second physical pipeline have support parameters corresponding to each of the applications;

in response to the camera components having a support parameter corresponding to each of the applications, the support parameters of the camera components corresponding to the second virtual pipeline are the same as that corresponding to the first virtual pipeline; and in response to the camera components not having a support parameter corresponding to each of the applications, the support parameters of the camera components corresponding to the second virtual pipeline are different from that corresponding to the first virtual pipeline.

8. The method for controlling multiple camera components, as claimed in claim 2, further comprising:

outputting an image of a last frame of the first virtual pipeline and an image of a first frame of the second virtual pipeline, sequentially.

9. The method as claimed in claim 2, wherein:

the multiple camera components corresponding to the first physical pipeline processing stages and the second physical pipeline processing stages include one or more of the following: obtaining an image source, denoising the image, performing a screen capture, and then sensing and quantifying a distortion.

10. The method for controlling multiple camera components, as claimed in claim 1, further comprising:

receiving at least one second request instruction from the second application calling multiple camera components, wherein the second application is different from the first application; and establishing and executing the second virtual pipeline in response to the second request instruction, wherein the second virtual pipeline includes a plurality of second virtual pipeline processing stages, and each of the second virtual pipeline processing stages respectively calls one of the multiple camera components to execute the second request instruction; and wherein the second virtual pipeline processing stages are the same as the first virtual pipeline processing stages.

11. A computer device, comprising:

a processor; a memory, connected to the processor and configured to store a computer program executed on the processor, wherein the processor executes the computer program to implement the method as claimed in claim 1; and the multiple camera components, connected to the processor and configured to perform corresponding operation in response to commands from the processor.

12. A non-transitory computer-readable storage medium, wherein the computer-readable storage medium stores computer programs, and the computer programs are executed by the processor to implement the method as claimed in claim 1.

* * * * *